United States Patent
Fife et al.

(10) Patent No.: US 8,176,062 B2
(45) Date of Patent: May 8, 2012

(54) SERVICE PROVIDER FRAMEWORK

(75) Inventors: John Fife, Scottsdale, AZ (US); David Krause, Scottsdale, AZ (US); John Montiel, Scottsdale, AZ (US); Paula Parker, Jensen Beach, FL (US); Terry Shay, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 468 days.

(21) Appl. No.: 12/111,076

(22) Filed: Apr. 28, 2008

(65) Prior Publication Data
US 2009/0271372 A1   Oct. 29, 2009

(51) Int. Cl.
*G06F 17/30* (2006.01)
(52) U.S. Cl. ............ 707/756; 707/769; 709/246
(58) Field of Classification Search .......... 709/246; 707/749, 752, 755, 969, 756, 769
See application file for complete search history.

(56) References Cited

U.S. PATENT DOCUMENTS

| | | | |
|---|---|---|---|
| 6,260,059 B1 * | 7/2001 | Ueno et al. ............. 709/202 |
| 6,708,186 B1 * | 3/2004 | Claborn et al. ......... 707/754 |
| 6,934,702 B2 * | 8/2005 | Faybishenko et al. ... 707/749 |
| 7,243,138 B1 * | 7/2007 | Majkut et al. .......... 709/219 |
| 7,487,262 B2 * | 2/2009 | Cardina et al. ......... 709/246 |
| 2004/0039730 A1 * | 2/2004 | Saeki ..................... 707/2 |
| 2009/0125332 A1 * | 5/2009 | Martin .................... 705/3 |
| 2009/0271372 A1 * | 10/2009 | Fife et al. .............. 707/3 |

* cited by examiner

*Primary Examiner* — Sherief Badawi
(74) *Attorney, Agent, or Firm* — Snell & Wilmer L.L.P.

(57) ABSTRACT

Providing a dynamic data translation service in a framework that encapsulates other valuable service functions is disclosed. An information technology infrastructure operates in different environments, uses different formats and accesses complex and frequently changing data schemas. The service provider framework provides core computing process automation and dynamic data translation functionality in an encapsulated service that shields requesting systems from data schemas that are often both complex and prone to frequent changes.

12 Claims, 2 Drawing Sheets

SERVICE PROVIDER FRAMEWORK

FIELD OF THE INVENTION

The present invention generally relates to providing a service provider framework in a distributed computing or service oriented information technology environment. More particularly, the invention relates to providing a dynamic data translation service in a framework that encapsulates other service functions.

BACKGROUND OF THE INVENTION

A recent trend exists wherein information technology ("IT") departments of companies and other entities design, configure and manage hardware and software assets to support business processes across the entire business cycle. Many companies have already enabled many of their IT systems to be available across departments, divisions and even to external business partners. To accomplish this, IT departments often implement an IT strategy that supports the connecting or sharing of resources and data in a flexible and standardized manner.

To accomplish the goal of flexible, standardized sharing of resources and data, some IT departments have adopted a service-oriented architecture ("SOA"). The SOA approach is relatively new and standards and new technologies to support SOA continue to emerge and evolve. One approach to implementing an SOA is the web services approach.

Typically, web services perform business functions that range from a simple data query to extensive transactions. Additionally, web services are often implemented to provide encapsulated access to core IT capabilities. Web services are implemented as self-contained, modular applications and are typically stored and invoked on a network. Developing a web services approach typically includes encapsulating business processes and core capabilities, modernizing existing assets through a standard interface, writing integration logic, and exposing the applications as services that are accessed over a network.

The integration logic component of a service often includes data translation and/or transformation capabilities. For instance, an external software application may access a service that provides access to a particular set of data such as the customer profile information for a given account number. However, the external application may not know the particulars of the database layout from which the information is to be acquired. To accommodate this functionality, services often include a "translate" (e.g., "transform") capability that converts the request data into a format that the target database understands. Current methods typically provide data dictionary or copybook functions that contain the information to perform data translations. However, current solutions are often limited because the translation capabilities of a service are static (i.e. established at compile time). Therefore, a long-felt need exists for an IT service framework that enables dynamic data translation capabilities.

SUMMARY OF THE INVENTION

The present invention improves upon existing systems and methods by providing a tangible, integrated, automated and dynamic information technology service provider framework. The service provider framework provides support for multiple operating systems, multiple transaction execution environments and multiple message formats. Furthermore, the service provider framework provides dynamic data translation functionality in an encapsulated service that shields requesting systems from data schemas that are both complex and prone to frequent changes.

In one embodiment, the system includes a service provider framework that has multiple components and capabilities including: a workflow engine, an interface module (i.e. an "interface wrapper"), a data object, a dynamic data dictionary, a parser, a formatter, a trace function, an exception handler, a display or log, a resource performance tool, and multiple methods and/or functions capable of communicating with external modules such as a data access module.

The system provides a response to a request message using a dynamic metadata dictionary. A request message in one format is received and parsed into a parsed message which is in a different format. Using the dynamic metadata dictionary which describes the location and the data element definition for each data element of an entity's enterprise data architecture (e.g. the database systems of record), a data query is created that contains a location and a data element definition. The data query is sent to a data access module that accesses the enterprise data architecture. A response to the request is received from the data access module and formatted into a reply message.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment for purposes of illustration and its best mode, and not of limitation. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process descriptions may be executed in any order and are not limited to the order presented. References to singular include plural, and references to plural include singular.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a graphical user interface (GUI), a software module, logic engines, databases and computer networks. While the system may contemplate upgrades or reconfigurations of existing processing systems, changes to existing databases and business information system tools are not necessarily required by the present invention.

The exemplary benefits provided by the representative embodiments include reducing or eliminating redundant development of service exposure code or software, improving efficiency and reliability of computing and/or data processing services, decreasing the delivery time associated with designing, building and/or deploying software applications, and reducing costs associated with maintaining redundant software and hardware resources. The service provider framework encapsulates business processes and information technology processing tasks. The encapsulation of this functionality fully or partially shields the user from the complexities associated with multiple computing environments, multiple message formats and rapidly changing data schemas.

While described in the context of systems and methods that enable data access and the provision of infrastructure services that utilize mainframe based IT assets, practitioners will appreciate that certain embodiments may be similarly used to reduce cost, improve reliability and increase efficiency in the context of providing IT services that leverage non-mainframe assets and environments. For example, in one embodiment, a reporting component for system and resource availability that interfaces to other IT systems (e.g. an enterprise dashboard that monitors the health of systems and resources) is enabled.

While the description makes reference to specific technologies, system architectures and data management techniques, practitioners will appreciate that this description is but one embodiment and that other devices and/or methods may be implemented without departing from the scope of the invention. Similarly, while the description makes frequent reference to a web client, practitioners will appreciate that other examples of communicating recommendations, presenting data, gathering feedback, initiating transactions and the like may be accomplished by using a variety of user interfaces including handheld devices such as personal digital assistants and cellular telephones.

"Service" or "Web service" may include any automated function, method, procedure, activity, task, business process, computing technology, information technology and/or data processing capability.

"Entity" may include any individual, consumer, customer, group, business, organization, government entity, transaction account issuer or processor (e.g., credit, charge, etc), merchant, consortium of merchants, account holder, charitable organization, software, hardware, and/or any other entity.

"Enterprise" may include any entity that stores data or information and/or provides access to IT resources.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account number may be, for example, any number or alpha-numeric characters that identify a particular merchant for purposes of card acceptance, account reconciliation, reporting, or the like.

A "transaction account" ("TXA") includes any account that may be used to facilitate a financial transaction. A "TXA issuer" includes any entity that offers TXA services to customers.

A "consumer" includes any software, hardware, individual and/or entity that consumes products or services.

A "financial processor" may include any entity which processes information or transactions, issues accounts, acquires financial information, settles accounts, conducts dispute resolution regarding accounts, and/or the like.

Figure 1:
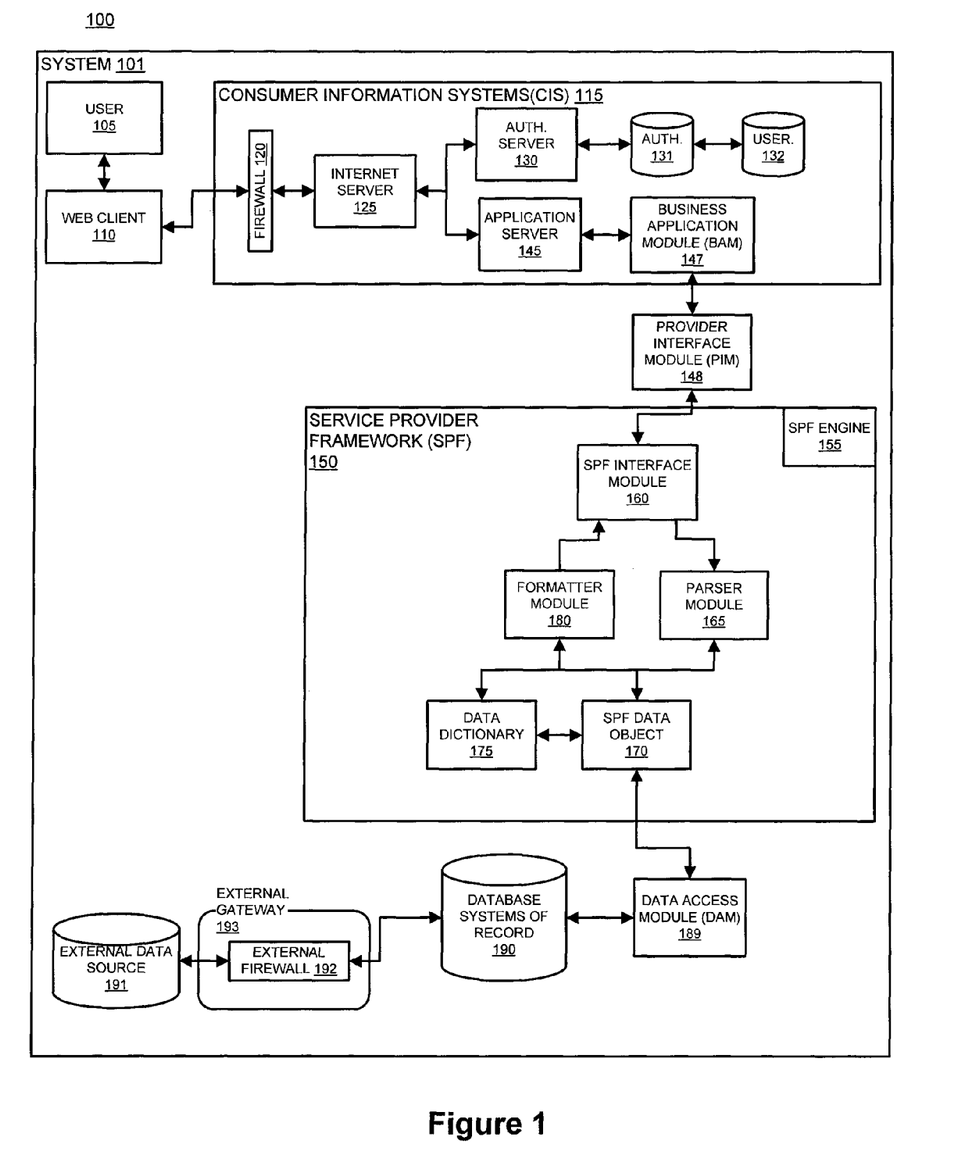
FIG. 1 is an overview of a representative system for providing a service provider framework, in accordance with one embodiment of the present invention.

With reference to FIG. 1, a "user" may include any individual, entity, or consumer that interacts with system 101. User 105 may perform tasks such as requesting, retrieving, updating, analyzing, entering and/or modifying data. User 105 may be, for example, a consumer accessing a TXA issuer's online portal and viewing a list of recent transactions. User 105 may interface with Internet server 125 via any communication protocol, device or method discussed herein, known in the art, or later developed. In one embodiment, user 105 may interact with CIS 115 via an Internet browser at a web client 110.

System 101 includes a user 105 interfacing with a consumer information system ("CIS") 115 by way of a web client 110. Web client 110 includes any hardware and/or software suitably configured to facilitate requesting, retrieving, updating, analyzing, entering and/or modifying data. The data may include any data stored by an enterprise such as, for example, account data, customer profile data, transactions records, partner data, marketing data, and the like. Web client 110 includes any device (e.g., personal computer), which communicates (in any manner discussed herein) with the CIS 115 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, minicomputers, PC servers, pervasive computers, network sets of computers and/or the like. Practitioners will appreciate that the web client 110 may or may not be in direct contact with the CIS 115. For example, the web client 110 may access the services of the CIS 115 through another server, which may have a direct or indirect connection to Internet server 125.

Various embodiments contemplate uses in association with billing systems, electronic presentment and payment systems, marketing systems, consumer portals, business intelligence systems, operational support systems, reporting systems, web services, pervasive and individualized solutions, open source, biometrics, mobility and wireless solutions, commodity computing, grid computing and/or mesh computing. For example, in an embodiment, the web client 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The user 105 may communicate with the CIS 115 through a firewall 120 to help ensure the integrity of the CIS 115 components. Internet server 125 may include any hardware and/or software suitably configured to facilitate communications between the web client 110 and one or more CIS 115 components.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the authentication database 131 and the user database 132.

Application server 145 may include any hardware and/or software suitably configured to serve applications and data to a connected web client 110. The business application module ("BAM") 147 is configured to provide functionality to user 105. For example, in one embodiment, BAM 147 is a customer portal for a TXA issuer that provides, among other functions, access to account information for customers of the TXA issuers (depicted as user 105 in FIG. 1). Additionally, BAM 147 may include any hardware and/or software suitably configured to receive requests from the web client 110 via Internet server 125 and the application server 145. In one embodiment, the BAM 147 may be configured to interact with other system 101 components to perform complex calculations, retrieve additional data, format data into reports, create XML representations of data, construct markup language documents, and/or the like. Moreover, the BAM 147 may reside as a standalone system or may be incorporated with the application server 145 or any other CIS 115 component as program code.

BAM 147 is further configured to access the services provided by the service provider framework ("SPF") 150. Provider interface module ("PIM") 148 includes a module (e.g., software) that provides an interface between the BAM 147 and the SPF 150. In one embodiment, PIM 148 establishes ownership of the service request. In one embodiment, PIM 148 establishes the security context for the request.

SPF 150 provides functionality by exposing services to requesting applications, systems or other services. In one embodiment, in addition to other functions, SPF provides tracing, exception tracking, and resource tracking functions. The trace function enables debugging functionality. The exception tracking function monitors errors that occur within SPF 150 or any of its associated components. For instance, SPF engine 155 accesses the exception tracking function to determine the success of processing activities. The log function enables writing the trace and tracking data to a log and/or a display. The resource tracking function provides various statistics on the usage and runtime of the SPF 150 resources. In one embodiment, SPF 150 provides data transformation services. SPF may also support multiple messaging formats (e.g. XML, etc.) SPF may also support execution of functions across multiple computing environments, proprietary software products and operating systems.

SPF engine 155 provides logic and functions that process requests from BAM 147. In one embodiment, SPF engine 155 provides workflow and control functionality for the modules and components of SPF 150. In one embodiment, SPF engine 155 enables iterative or looping control in order to decompose a large unit of work into smaller units of work (subunits) and to reconstruct the results of the subunits appropriately. For instance, looping functionality is used to accommodate disparities in allowable message sizes (e.g. if the requesting system supports a 256 kilobyte message size but the transaction invoked by DAM 189 only supports a 32 kilobyte message size).

SPF interface module 160 provides SPF wrapper logic for each supported environment that aligns with an approved architectural pattern and prescription recognized by the SPF 150.

Parser module 165 identifies the request format type (e.g. XML) and accesses the appropriate parser logic to parse the request message. In one embodiment, the parser identifies various elementary data items and puts the data items into the SPF data object 170.

SPF data object 170 provides both storage and logic. In one embodiment, the data component stores the data associated with a service, the request and the response, and provides access to the data. In one embodiment, the SPF data object provides access to its data through properly formatted program calls and methods.

Data dictionary 175 includes a centralized repository of data that describes, for example, the elements, relationships, constraints, format, data type, origin, usage and/or history of the data element. The data dictionary 175 supports dynamic access to metadata such that it is accessed at the time of execution (i.e. at runtime). In one embodiment, the data dictionary 175 includes a high-level data dictionary that offers a richer set of metadata and functionality than a data dictionary that is native to a database management system (e.g. Oracle's native DBMS data dictionary). The data dictionary 175 may provide support for multiple entity-relationship models that enable different applications to use the same database. In one embodiment, the data dictionary enables query optimization techniques.

Formatter module 180 provides logic and functionality to format a reply message to BAM 147. Data access module ("DAM") 189 interacts with SPF 150 and database systems of record 190. In one embodiment, DAM 189 executes business logic and formatting logic on the request data and submits requests.

FIG. 1 depicts databases that are included in an exemplary embodiment of the invention. A representative list of various databases used herein includes: an authentication database 131, a user database 132, SPF data object 170 and database systems of record ("SOR") 190. As practitioners will appreciate, while depicted as a single entity for the purposes of illustration, databases residing within system 101 may represent multiple hardware, software, database, data structure and networking components.

Authentication database 131 may store information used in the authentication process such as, for example, user identifiers, passwords, access privileges, user preferences, user statistics, and the like. The user database 132 maintains user information and credentials for CIS 115 users. The SPF data object stores data related to request and response messages. The SOR database 190 represents an enterprise data architecture which may include any variety of information. For instance, in one embodiment, SOR database 190 includes multiple databases such as a consumer account database, a transactions database, a marketing database, a merchant rewards database, a relationship management database, an accounting database, a billing systems database and the like. As practitioners will appreciate, embodiments are not limited to the exemplary databases described above, nor do embodiments necessarily utilize each of the disclosed exemplary databases.

In addition to the components described above, the system 101, the CIS 115 and the SPF 150 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

As those skilled in the art will appreciate, the web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, minicomputer, mainframe, mobile device or the like. Web client 110 can be in a home or business environment with access to a network. In an embodiment, access is through a network or the Internet through a commercially available web-browser software package. Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 120, as used herein, may comprise any hardware and/or software suitably configured to protect the CIS 115 components from users of other networks. Firewall 120 may reside in varying configurations including stateful inspection, proxy based and packet filtering, among others. Firewall 120 may be integrated as software within Internet server 125, any other system components, or may reside within another computing device or may take the form of a standalone hardware component.

Internet server 125 may be configured to transmit data to the web client 110 within markup language documents. As used herein, "data" may include encompassing information such as commands, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Like Internet server 125, the application server 145 may communicate with any number of other servers, databases and/or components through any means known in the art. Further, the application server 145 may serve as a conduit between the web client 110 and the various systems and components of the CIS 115. Internet server 125 may interface with the application server 145 through any means known in the art including a LAN/WAN, for example. Application server 145 may further invoke software modules such as the BAM 147 or the PIM 148 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Any databases discussed herein may include relational, hierarchical, graphical, or object-oriented structure and/or any other database configurations. Common database products that may be used to implement the databases include DB2 by IBM (Armork, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second parties. Each of the three data sets in this example may contain different information that is stored using different data storage formats and/or techniques. Further, each data set may contain subsets of data that also may be distinct from other subsets.

As stated above, in various embodiments of system 101, the data can be stored without regard to a common format. However, in one embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 101 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The system 101 may be interconnected to an external data source 161 (for example, to obtain data from a vendor) via a second network, referred to as the external gateway 163. The external gateway 163 may include any hardware and/or software suitably configured to facilitate communications and/or process transactions between the system 101 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing in external data source 161 or any other known configuration. External gateway 163 may be configured to deliver data directly to system 101 components (such as BAM 147) and to interact with other systems and components such as DAM 189. In one embodiment, the external gateway 163 may comprise web services that are invoked to exchange data between the various disclosed systems. The external gateway 163 represents existing proprietary networks that presently accommodate data exchange for data such as financial transactions, consumer demographics, billing transactions and the like. The external gateway 163 is a closed network that is assumed to be secure from eavesdroppers.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIG. 2 may be executed in any order and are not limited to the order presented. It will be appreciated that the following description makes appropriate references not only to the steps depicted in FIG. 2, but also to the various system components as described above with reference to FIG. 1.

With reference to FIG. 1, in one embodiment, when user 105 logs on to an application, Internet server 125 may invoke an application server 145. Application server 145 invokes logic in the BAM 147 or other application modules by passing parameters relating to the user's 105 requests for data. Transmissions between user 105 and Internet server 125 may pass through a firewall 120 to help ensure the integrity of the CIS 115 components. Practitioners will appreciate that the invention may incorporate any number of security schemes or none at all. In one embodiment, the Internet server 125 receives page requests from the web client 110 and interacts with various other system 101 components to perform tasks related to requests from the web client 110.

Internet server 125 may invoke an authentication server 130 to verify the identity of user 105 and assign specific access rights to user 105. In order to control access to the application server 145 or any other component of the CIS 115, Internet server 125 may invoke an authentication server 130 in response to user 105 submissions of authentication credentials received at Internet server 125. When a request to access system 101 is received from Internet server 125, Internet server 125 determines if authentication is required and transmits a prompt to the web client 110. User 105 enters authentication data at the web client 110, which transmits the authentication data to Internet server 125. Internet server 125 passes the authentication data to authentication server which queries the Authentication database 132 for corresponding credentials. When user 105 is authenticated, user 105 may access various applications and their corresponding data sources.

Figure 2:
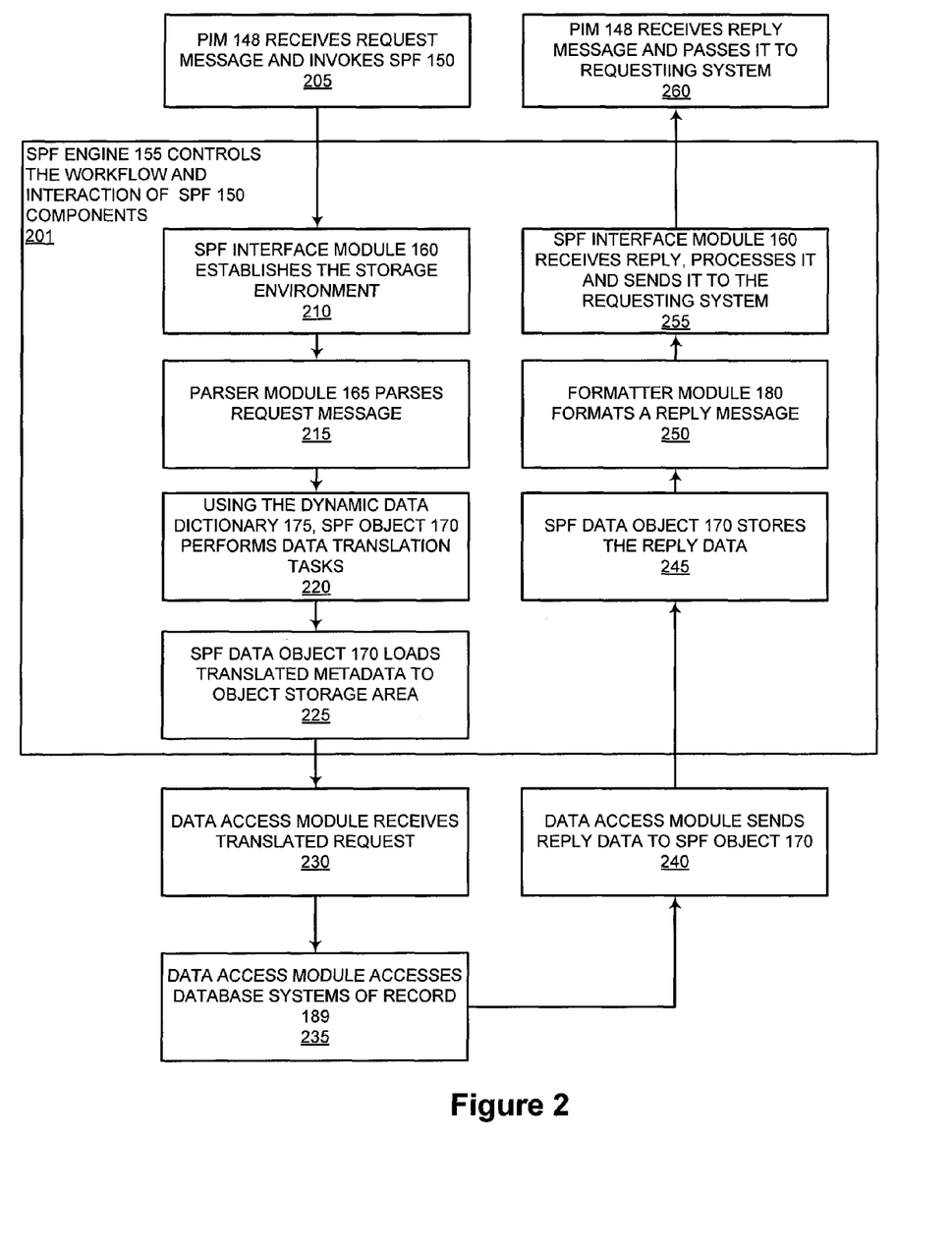
FIG. 2 is a representative process flow diagram for providing a response to a request message using a dynamic metadata dictionary, in accordance with one embodiment of the present invention.

FIG. 2 depicts a representative process for providing an IT framework that exposes services for use by consumer applications (such as, e.g. BAM 147). PIM 148 receives a request message from BAM 147 (Step 205). In one embodiment, a separate PIM 148 instance is established for each service provider that uses the SPF 150. PIM 148 establishes ownership of the service request which allows IT departments to monitor usage of their IT assets. For example, BAM 147 may be a customer portal for a TXA issuer that provides, among other functions, access to account information for customers of the TXA issuers (depicted as user 105 in FIG. 1). Upon receiving a request, BAM 147 passes the request to the customer service department's PIM 148 instance. The customer service department may be an organization internal to the TXA issuer or may be a third-party entity. PIM 148 is configured to verify the identity and permission level of the requester. PIM 148 records information indicating that the customer service department made a request for resources. In one embodiment, PIM 148 establishes the security context for the request. Having an intermediate software module (i.e. PIM 148) may partially or fully alleviate SPF engine 150 from having to validate requests from numerous sources.

Referring again to FIG. 2, in the representative process, the SPF 150 interface module receives control from the PIM 148. The SPF engine 155 controls the workflow and interaction of all SPF 150 activities and components (step 201). The module may monitor progress, invoke applications, trigger events and execute workflow logic that drives the SPF workflow. As practitioners will appreciate SPF engine 155 may take control of the process and call the appropriate modules or may provide instruction for a module to call a second module directly.

The SPF interface module 160 receives a request and accesses the appropriate parameters for the requested operating environment (step 205). For instance, for a request that is to be executed in IBM's IMS environment, SPF interface module 160 includes information regarding the proper parameters for that environment (e.g. message length limited to 32 kilobytes). In one embodiment, SPF interface module 160 establishes the runtime environment and/or establishes the storage environment for the request (step 210). In one embodiment, SPF interface module 160 segments messages according to the operating environment.

Parser module 165 identifies the request format type (e.g. XML) and calls the appropriate parser logic (step 215). Parser module 165 identifies various elementary data items, creates or translates metadata and stores all the data and metadata in the SPF object 170.

SPF data object 170 performs data translation tasks using information stored in the data dictionary 175 (step 220). The SPF data object accesses data dictionary 175 and loads request data as metadata into the SPF data object 170 data storage area (step 225). In one embodiment, at execution time, when the SPF data object is invoked to store data, it in turn invokes data dictionary 175, which describes, via metadata, the data elements that are a possible as part of the service being consumed. The data elements identified as part of the parsing process are stored by SPF data object 170 in memory. The data elements are stored in offset from an established starting point based on the metadata that is returned from data dictionary 175. In one embodiment, SPF data object 170 is configured with methods that are accessible by DAM 189 directly. In one embodiment, DAM may access SPF data object 170 by way of the methods and functions of SPF engine 155.

DAM 189 is invoked (e.g. receives a request message) from a SPF 150 component (step 230), executes business logic and interacts with an enterprise data architecture and/or one or more database systems of record to satisfy the request (step 235). In one embodiment DAM 189 is a software module external to SPF 150. DAM 189 is owned by providers of other application, data processing and IT related functions uses the services encapsulated by SPF 150. SPF 150 shields DAM 189 from the complexity associated with, for example, multiple computing environments, multiple messaging formats and changes in computing parameters.

DAM 189 sends reply data to SPF object 170 (step 240). SPF data object 170 receives reply data and loads it into the object's data storage area (step 245). In one embodiment, SPF data object 170 performs additional data translation tasks. Formatter module 180 formats a response message using data and metadata from data object 170 and data dictionary 175 (step 250). SPF interface module 160 receives the reply message and processes it, for example, by segmenting it into a smaller, or building it into a larger, response message, and passes it to PIM 149 (step 255). In one embodiment, SPF interface module 160 passes the response message to the requesting system. PIM 148 receives the response message and passes it to requesting system (step 260). In one embodiment, the reply message is sent to the environment from which the request came. In one embodiment, the reply is sent to an enterprise middleware infrastructure that supports multiple environments.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A method comprising:
   parsing, by a response computer for providing a response to a request message using a dynamic metadata dictionary, the request message having a first format into a parsed message having a second format;
   determining, by the computer, a requested service associated with the request;
   accessing, by the computer, the dynamic metadata dictionary to assemble data element information by determining, based upon the requested service, a location and a data element definition for a data element associated with the parsed message;
   storing, by the computer, the data element in offset from an established starting point based on metadata that is returned from the dynamic metadata dictionary,
   creating, by the computer, a data query based upon the request message and using the data element information;
   sending, by the computer, the data query to a data access module, wherein the data access module accesses, using the data query, the enterprise data architecture;
   receiving, by the computer, a query response from the data access module;
   determining, by the computer, a third format based upon the dynamic metadata dictionary and the requested service;
   formatting, by the computer, the query response into a reply message in the third format; and
   sending, by the computer, the reply message in response to the request message.

2. The method of claim 1, further comprising storing the parsed message in core memory.

3. The method of claim 1, further comprising storing the parsed message in a database.

4. The method of claim 1, wherein the parsing further comprises performing a data transformation to create the parsed message having the second format.

5. The method of claim 1, further comprising at least one of sending the reply message across multiple operating system environments and sending the reply message to an enterprise middleware infrastructure.

6. The method of claim 1, further comprising monitoring a status of at least one of: the receiving the request message, the parsing, the accessing, the creating, the sending the data query, the receiving the query response, the formatting and the sending the reply message.

7. The method of claim 1, further comprising creating a status indicator corresponding to at least one of: the receiving the request message, the parsing, the accessing, the creating, the sending the data query, the receiving the query response, the formatting and the sending the reply message.

8. The method of claim 7, further comprising storing the status indicator in a trace log.

9. The method of claim 1, further comprising handling exceptions according to a predetermined error handling strategy.

10. A non-transitory machine-readable medium having stored thereon a plurality of instructions, the plurality of instructions when executed by a response processor for providing a response to a request message using a dynamic metadata dictionary, cause the processor to perform operations comprising:
    receiving, by the processor, the request message formatted in a first format;
    parsing, by the processor, the request message into a parsed message having a second format;
    determining, by the processor, a requested service associated with the request;
    accessing, by the processor, the dynamic metadata dictionary to assemble data element information by determining, based upon the requested service, a location and a data element definition for a data element associated with the parsed message;
    storing, by the computer, the data element in offset from an established starting point based on metadata that is returned from the dynamic metadata dictionary;
    creating, by the processor, a data query based upon the request message and using the data element information;
    sending, by the processor, the data query to a data access module, wherein the data access module accesses, using the data query, the enterprise data architecture;
    receiving, by the processor, a query response from the data access module;
    determining, by the processor, a third format based upon the dynamic metadata dictionary and the requested service;
    formatting, by the processor, the query response into a reply message in the third format; and
    sending, by the processor, the reply message in response to the request message.

11. A system comprising:
    a network interface communicating with a non-transitory memory;
    the memory communicating with a response processor for providing a response to a request message using a dynamic metadata dictionary; and
    the processor, when executing a computer program, performs operations comprising:
    parsing, by the processor, the request message having a first format into a parsed message having a second format;
    determining, by the processor, a requested service associated with the request;
    accessing, by the processor, the dynamic metadata dictionary to assemble data element information by determining, based upon the requested service, a location and a data element definition for a data element associated with the parsed message;
    storing, by the computer, the data element in offset from an established starting point based on metadata that is returned from the dynamic metadata dictionary;

creating, by the processor, a data query based upon the request message and using the data element information;

sending, by the processor, the data query to a data access module, wherein the data access module accesses, using the data query, the enterprise data architecture;

receiving, by the processor, a query response from the data access module;

determining, by the processor, a third format based upon the dynamic metadata dictionary and the requested service;

formatting, by the processor, the query response into a reply message in the third format; and sending, by the processor, the reply message in response to the request message.

12. The system of claim 11, further comprising formatting, by the processor, the query response into the reply message in the first format.

* * * * *